S. B. CONOVER.
Wheel Cultivator and Planter.
No. 63,476.
Patented Apr. 2, 1867.
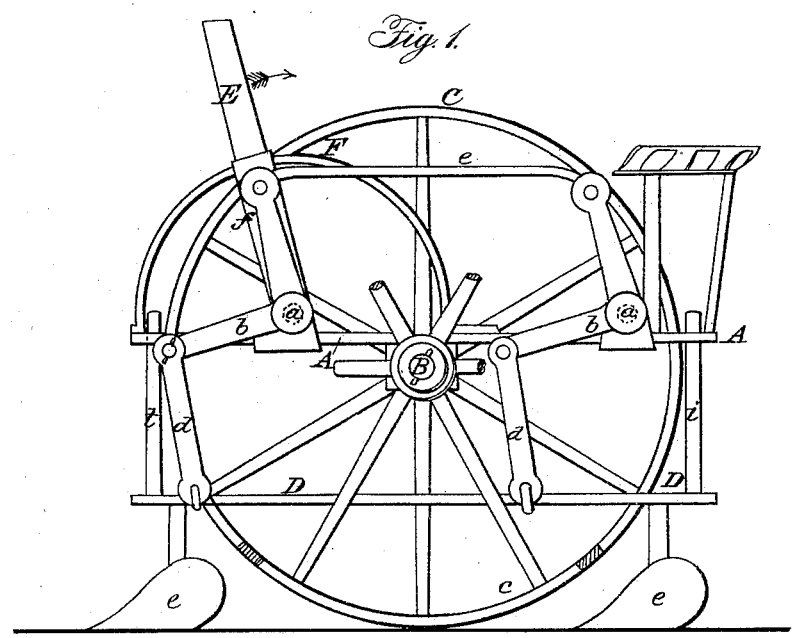
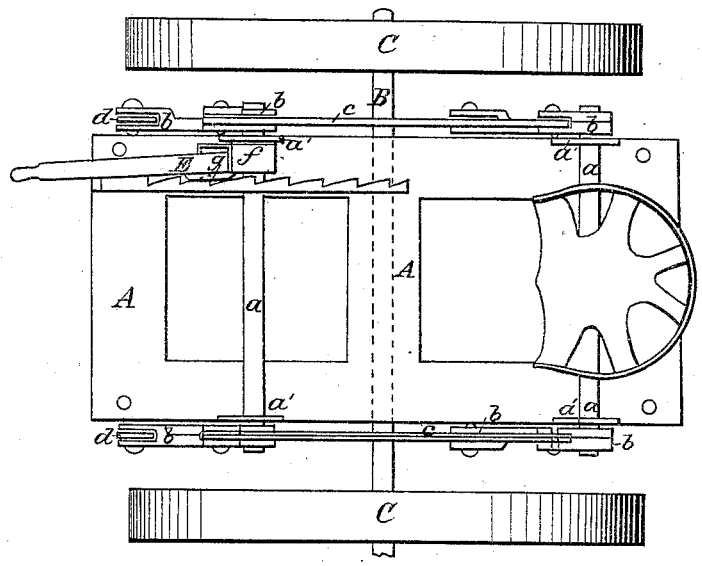
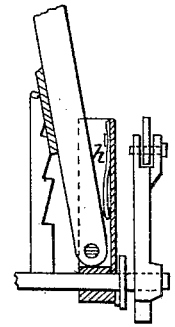
Inventor:
S. B. Conover

United States Patent Office

S. B. CONOVER, OF NEW YORK, N. Y.

Letters Patent No. 63,476, dated April 2, 1867.

---

IMPROVEMENT IN COMBINED CULTIVATOR AND PLANTER.

---

The Schedule referred to in these Letters Patent and making part of the same.

---

TO ALL WHOM IT MAY CONCERN:

Be it known that I, S. B. CONOVER, of the city, county, and State of New York, have invented certain new and useful Improvements in Digging, Cultivating, and Planting Machines; and I do hereby declare that the following is a full, clear, and exact description of the same, reference being had to the accompanying drawings, making a portion of this specification, in which—

Figure 1 is a side view of a machine constructed according to my invention.

Figure 2 is a plan view of the same.

Figure 3 is a detached vertical section, taken at right angles to fig. 1, of a portion of the same.

Similar letters of reference indicate corresponding parts in all the figures.

This invention is applicable to potato diggers, cultivators, and other similar implements designed either for tilling the soil or for harvesting root crops therefrom; and it consists in a novel combination of parts whereby a supplementary frame, situated underneath a suitable main frame, and furnished with shares or equivalent devices, may be raised or lowered to any desired distance from the ground or be retained in an elevated position when required. The invention further consists in a novel means whereby the aforesaid supplementary frame is effectually braced against the strain exerted upon it by the shares or like devices during the operation of the machine in digging or cultivating the soil, and is also securely retained in a position nearly or quite parallel with the main frame at whatever distance it may be placed therefrom.

To enable others to understand the construction and operation of my invention, I will proceed to describe it with reference to the drawings.

The horizontal main frame of the machine is shown at A, and is sustained upon a transverse axle, B, which is furnished with suitable supporting-wheels, C. Situated, one near the forward and the other near the rearmost end of the main frame A, are two transverse rock-shafts, $a$, which work in appropriate bearings, $a'$, and each of which is furnished at each end with a bell-crank lever, E. The upper extremities of the two bell-crank levers thus situated at either side of the main frame, are connected by means of a horizontal connecting-rod, $c$, while the lower or nearly horizontal arm of each of the aforesaid bell-crank levers is connected, by a vertical rod or link, $d$, with the supplemental frame D, which occupies a horizontal position, and is situated underneath the main frame A, as represented in fig. 1, and which, furthermore, has attached to it shares, $e$, or other equivalent or appropriate digging devices, designed for tilling or cultivating the ground or for harvesting potatoes or other root crops therefrom, or is furnished with suitable seeding or planting stocks or shares when the apparatus is employed for planting purposes. Secured to the foremost of the transverse rock-shafts $a$, near one end thereof, is a strong metallic case $f$, the inner side of which is open, and in which is pivoted the lower end of an upright operating lever, E, the pivot of such lever being placed longitudinally with regard to the main frame, so that the aforesaid lever E may move inward through the open side of the case $f$, in such manner that a metallic lip or flanch, $g$, secured lengthwise upon the inner side of the said lever, will catch upon the teeth of a curved or semicircular ratchet-bar, F, fixed in an upright position upon the main frame. Placed within the case $f$, behind the lever E, is a spring, $h$, which serves to force the lip $g$ of the lever in contact with the ratchet-bar F, as just mentioned. Extending upward from the supplemental frame D are any desired number (but preferably four, one at each corner of the said frame) of vertical rods or braces, $i$, which pass through and slide in suitable holes or slots formed vertically in the main frame A, and which serve to brace and hold the supplemental frame in position against the strain exerted upon it by the action of the shares $e$ in digging or cultivating the soil, and also insure the retention thereof in proper position underneath, and nearly or quite parallel with the main frame A. When it is desired to raise the supplemental frame D the operating lever E is pulled back in the direction indicated by the arrow in fig. 1, and turning the rock-shaft $a$, to which it is attached, operates the bell-crank levers $b$ to raise the aforesaid frame, the spring $h$ allowing the lever to yield laterally, so that the lip $g$ may slide over the inclined surfaces of the teeth of the ratchet-bar F until the supplemental frame, being brought to the required height, the lever is pressed inward by the said spring, and the lip or flanch thereof catches upon the shoulder or flat end of the adjacent tooth of the fixed ratchet-bar F, and thus retains the lever in a fixed position and holds the supplementary frame at the required height from the ground. In lowering the supplemental frame, the lever F is first pushed laterally outward until the lip or flanch thereof is brought clear from the ratchet-bar P, whereupon the said frame is allowed to descend, by its own weight, to the required degree.

What I claim as my invention, and desire to secure by Letters Patent, is—

1. The combination, with the main frame A, supplemental frame D, and fixed ratchet-bar F, of the operating lever E, bell-crank levers $b$, horizontal connecting-rods $c$, and upright connecting-rods $d$, substantially as herein set forth for the purpose specified.

2. The sliding rods or braces $i$, attached to the supplemental frame D, passing up through suitable holes or slots, either vertically or on an incline, in combination with the main frame A and operating parts above recited, substantially as herein set forth for the purpose specified.

S. B. CONOVER.

Witnesses:
   J. W. COOMBS,
   G. W. REED.